Feb. 11, 1969 D. M. PARK Re. 26,521

AUTOMATIC REPETITIVE RHYTHM INSTRUMENT TIMING CIRCUITRY

Original Filed June 26, 1964

Sheet 1 of 6

INVENTOR.
Donald M. Park

BY B. B. Olive
ATTORNEY

AUTOMATIC REPETITIVE RHYTHM INSTRUMENT TIMING CIRCUITRY

Original Filed June 26, 1964

INVENTOR.
Donald M. Park

BY

B. B. Olive
ATTORNEY

AUTOMATIC REPETITIVE RHYTHM INSTRUMENT TIMING CIRCUITRY

Original Filed June 26, 1964

INVENTOR.
Donald M. Park

BY

B. B. Olms
ATTORNEY

AUTOMATIC REPETITIVE RHYTHM INSTRUMENT TIMING CIRCUITRY

Original Filed June 26, 1964

INVENTOR.
Donald M. Park

BY

B. P. Olive
ATTORNEY

AUTOMATIC REPETITIVE RHYTHM INSTRUMENT TIMING CIRCUITRY

Original Filed June 26, 1964

INVENTOR.
Donald M. Park

BY

ATTORNEY

AUTOMATIC REPETITIVE RHYTHM INSTRUMENT TIMING CIRCUITRY

Original Filed June 26, 1964

INVENTOR.
Donald M. Park

BY B. B. Olive
ATTORNEY

United States Patent Office

Re. 26,521
Reissued Feb. 11, 1969

26,521

AUTOMATIC REPETITIVE RHYTHM INSTRUMENT TIMING CIRCUITRY

Donald M. Park, by the Seeburg Corporation, Chicago, Ill., a corporation of Delaware, assignee Original No. 3,255,292, dated June 7, 1966, Ser. No. 378,093, June 26, 1964. Application for reissue Aug. 8, 1967, Ser. No. 666,221
U.S. Cl. 84—1.03 15 Claims
Int. Cl. G10f *1/00;* G10h *1/02*

Matter enclosed in heavy brackets [ ] appears in the original patent but forms no part of this reissue specification; matter printed in italics indicates the additions made by reissue.

*ABSTRACT OF THE DISCLOSURE*

*Apparatus is provided for electronically producing an automatic rhythm accompaniment for a musical instrument. The apparatus includes a counter circuit driven by a pulse generator. Output pulses of the counter circuit are conveyed to a diode logic matrix which combines with the counter circuit to distribute instrument driving pulses in pre-arranged patterns. A switching arrangement provides for selection of a desired pattern of instrument driving pulses from the diode logic matrix. The driving pulses actuate appropriate instrument simulating circuits to provide the desired rhythm accompaniment.*

*CROSS-REFERENCES TO RELATED APPLICATIONS*

This invention represents an improvement over the invention described in and this application is a continuation-in-part of my copending applications "Electronic Music Circuit," Serial No. 310,533, filed September 23, 1963, now U.S. Patent Number 3,146,290, and "Tempo Control for Electrical Musical Instruments," Serial No. 213,934, filed August 1, 1962, *now U.S. Patent Number 3,243,494.* The descriptions in said copending applications are incorporated herein by reference. This invention also represents an improvement over my prior *U.S.* Patent *Number* 3,105,106 to which reference will be made.

*BACKGROUND OF THE INVENTION*

*Field of the invention*

This invention relates generally to circuits for electrically producing music and particularly to an automatic repetitive rhythm instrument which can accompany a player operated instrument, such as an electronic organ, such that various selections of automatic repetitive rhythm sounds can be combined at the same tempo with those produced by the player operated instrument or [combined but] at an independent tempo.

*Description of the prior art*

One of the more popular electronic musical instruments is known as a "side man," and its purpose is to automatically produce a repetition of percussion rhythms. The "side man" is usually comprised of ten or more "instruments" such as Bass Drum, Tom-Toms, Blocks, Cymbals, and the like which may be electronically combined to produce rhythm such as the Tango, Rhumba, Fox Trot or Waltz. The "instruments" are produced electronically by phase shift oscillators or other noise generators, and when pulsed according to some predetermined time sequence as accompaniment for an electronic organ, they produce pleasing repetitive musical effects. The pulse generation, commutation and distribution necessay to produce the repetitive rhythms in the "side man"

usually involve some form of mechanical or electromechanical commutation.

In the older prior art repetitive rhythm or "side man" devices, the switching speed, that is, the rhythm speed or tempo, when playing any particular instrument or group of instruments is controlled by a conventional mechanical variable speed drive. This has produced various well-known noise and mechanical problems.

This type of communication has another disadvantage in that due to mechanical inertia speed cannot be changed instantaneously, so as to change the tempo of the repetitive rhythm instantaneously, whereas fast or instantaneous tempo change is recognized as adding much to the enjoyment of repetitive rhythm instrument accompaniment.

Another limitation of prior art repetitive rhythm devices particularly with regard to the circuitry which selects and pulses the instruments and instrument combinations has been an inability to provide complex mixing of instruments, mixing of special beats and the like. An advance in the art is provided by the inventions taught in the referred to [copending applications Serial No. 310,533 and Serial No. 213,934 and in my prior Patent 3,105,106] *patents (U.S. Patent Numbers 3,146,290; 3,243,494; and 3,105,106)* in that much of the circuitry of these prior inventions lends itself to rapid tempo change and to more complex rhythms even when obtained through electromechanical development and commutation of the instrument control pulses. The need has remained however in automatic repetitive rhythm circuitry for improvements in pulse generation, selection, mixing and distribution to the individual instruments and in tempo control, all of which improvements are basically concerned with more efficient utilization of the timing pulses both for instrument arrangements and tempo regulation.

*SUMMARY OF THE INVENTION*

*Briefly, in the preferred embodiments disclosed herein, a pulse generator provides a continuous succession of timing pulses. The frequency of the pulse generator, and hence the spacing of the timing pulses, is adjustable. Adjustment of the pulse generator frequency may be made automatically so that the tempo of the rhythm accompaniment apparatus follows the tempo at which the associated musical instrument is being played.*

*The continuous spatially undistributed pulses from the pulse generator are applied to a counter circuit. In order to obtain the necessary number of counter output pulses without using an excessively large number of counter stages, two separate sets of counter stages are utilized. The outputs of both sets of counter stages are applied to a diode logic matrix. Each unit of the diode logic matrix is supplied with two inputs, one from each set of counter stages. When the inputs from the two sets of counter stages have the correct polarities, the diode logic unit is activated. In this manner, each of the outputs from one set of counter stages may be used with each of the outputs from the other set of counter stages, with each combination controlling a separate diode logic unit. Thus, the two sets of counter stages provide the equivalent of a number of counter output pulses equal to the product of the output pulses from the two sets of counter stages.*

*The diode logic matrix is arranged to provide various combinations or patterns of instrument driving pulses derived from the individual diode logic units. By properly choosing the correct instrument driving pulse pattern for each instrument circuit, a large variety of rhythms may be produced. Choice of the correct driving pulse patterns is achieved by use of a relatively non-complex selector switch which connects the correct driving pulse pattern to each instrument circuit to yield the selected rhythm.*

It is therefore an object of this invention to provide [a]

substantially improved circuitry for an automatic repetitive rhythm instrument.

It is [anohter] *another* object of this invention to provide means for eliminating mechanical and electromechanical pulse generation and commutation in the automatic repetitive rhythm instrument.

Another object is to provide circuit means for electrically pulsing instrument generators in an automatic repetitive rhythm instrument which means provides a maximum range in deriving complex rhythms.

Another [odbject] *object* is to provide in an automatic repetitive rhythm instrument circuit means for electrically pulsing instrument generators with which the tempo or frequency of pulsing may be instantaneously changed.

Another object is to provide in an automatic repetitive rhythm instrument a pulse generation, selection, mixing distribution, and frequency control for pulsing and timing instrument generators which is entirely electrical or electronic in nature.

[The foregoing and another objects will appear from the drawings, in which:]

*DETAILED DESCRIPTION OF THE PREFERRED EMBODIMENTS*

As previously stated, the invention is primarily concerned with those aspects of an automatic repetitive rhythm instrument which have to do with instrument pulsing and timing. Before proceeding to the more detailed discussion of the invention, reference is made to the general diagram of FIGURE 1, in which 100 represents a continuous source of timing pulses provided by a suitable oscillator, the pulses being of equal magnitude and evenly spaced with respect to time according to some desired beat. The pulse source 100 is of variable frequency so as to give a variable beat to the music and is connected to a suitable frequency control 101 which may, for example, be regulated by a manual variable voltage device 102 or other similar manual device known to the art for controlling pulse generator frequency.

Figures 1, 11:
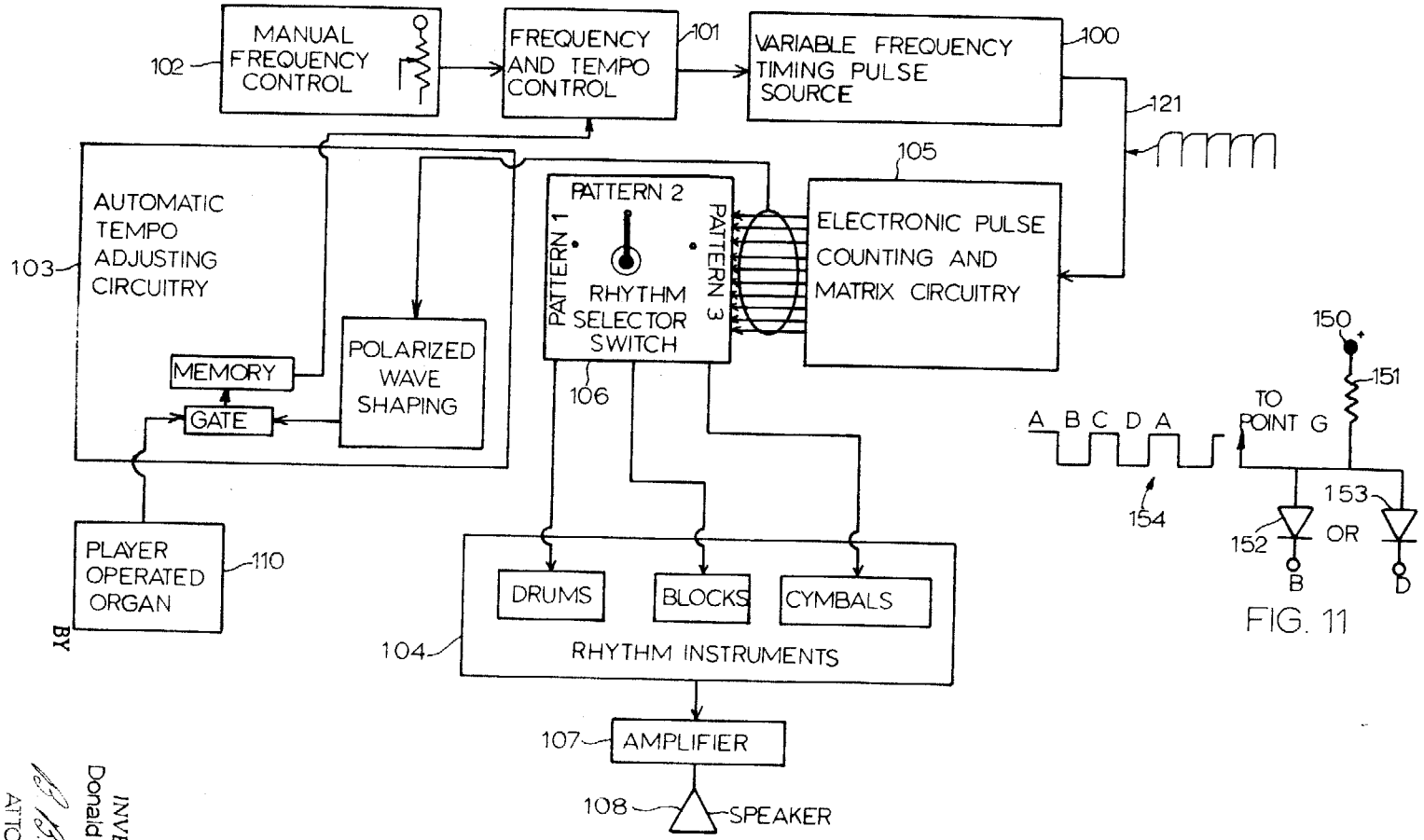
FIGURE 1 is a general schematic diagram of a musical circuit embodying the invention.
FIGURE 11 illustrates an example of an OR circuit useful in the invention.

In [the copending application Serial No. 213,934] *U.S. Patent Number 3,243,494,* there is disclosed a separate invention concerned with automatically synchronizing tempo of an automatic repetitive instrument and player instrument. Since the automatic as well as the manual type of tempo control may be combined with other elements of the present invention, FIGURE 1 represents at 103 an automatic tempo adjusting circuitry which may be of the type shown in the referred to [copending application Serial No. 213,934] *U.S. Patent Number 3,243,494* and which as indicated in FIGURE 1 is connected to pick up pulses entering the rhythm selector switch 106 and is also connected to the player operated device, e.g. the electric organ 110.

As fully explained in [the copending application Serial No. 213,934] *U.S. Patent Number 3,243,494,* the invention of the copending application effectively compares the tempo or frequency of a representative pulse from the player operated organ 110 with a pulse representative of tempo taken from one of the instruments 104 in the automatic repetitive rhythm device and as the organ tempo increases or decreases the tempo of the automatic repetitive rhythm device instruments increases or decreases in the same manner so as to keep the tempos synchronized.

As further explained in [the copending application Serial No. 213,934] *U.S. Patent Number 3,243,494,* the comparison and tempo synchronization is effected by developing an alternately positive-negative wave shape from a pulse representative of the repetitive rhythm instrument tempo. This wave shape is gated to a memory and the gate itself is ultimately controlled by one of the pedals of the organ which the repetitive rhythm instrument may accompany. The level of the memory controls the frequency of the pulse generator employed in the repetitive rhythm instrument. Thus, if the organ pedal tempo is synchronized with the repetitive instrument tempo the gating does not affect the level whereas if the gating lets either positive or negative portions of the developed wave shape through to the memory, the level and consequently the frequency of the pulse generator will change in a direction to bring the tempos of the organ and repetitive rhythm instrument into synchronization.

Continuing with FIGURE 1, the timing pulses are fed from source 100 to an electronic pulse counting and matrix circuitry 105 the purpose of which is to count the incoming spatially undistributed timing pulses and from these develop a plurality of wave shapes spatially distributed over a plurality of outputs such that logic theory may be employed in a suitable matrix later discussed to gain a wide choice of instrument actuating pulses which may be fed through an appropriate rhythm selector switch 106 to the instruments 104 and ultimately to the audio section represented by amplifier 107 and speaker 108. Simply as representative of instrument grouping there is shown an instrument group of drum, blocks and cymbals. As described in *U.S.* Patent *Number* 3,105,106, selector switch 106 enables individual instruments, e.g. a drum or blocks to be played or a combination of instruments, e.g. drum and blocks to be combined into some desired rhythm. That is, once the timing and instrument actuation pulses are presented to the selector switch, the operator merely by manual switching can direct particular instrument actuation pulses to particular instruments and thus determine which instruments or combination of instruments will be played.

In effect, circuitry 105 spatially divides the timing pulses in such a manner that a matrix is able to distribute them in a predetermined manner. Compared to prior art and my prior copending applications it will be immediately appreciated that the present invention which is primarily concerned with the circuitry 105 provides a completely electrical-electronic pulse generation, mixing, distribution and tempo regulation system for the automatic repetitive rhythm instrument. In the circuitry illustrated as exemplary embodiments in the previously referred to [copending application Serial No. 310,533 and Patent 3,105,-106] *U.S. Patent Numbers 3,146,290 and 3,105,106,* it should also be noted that the pulse generator in each case included a plurality of physically spaced terminals on which the timing pulses were generated and spatially distributed in a sequence. In comparison, in the present invention the timing pulse source 100 represents a source which produces on an output a continuous chain of spatially undistributed timing pulses to which the counting-matrix circuit 105 responds and provides on a plurality of output terminals any desired repeatable sequence of spatially distributed tone generator actuating pulses.

Figure 2:
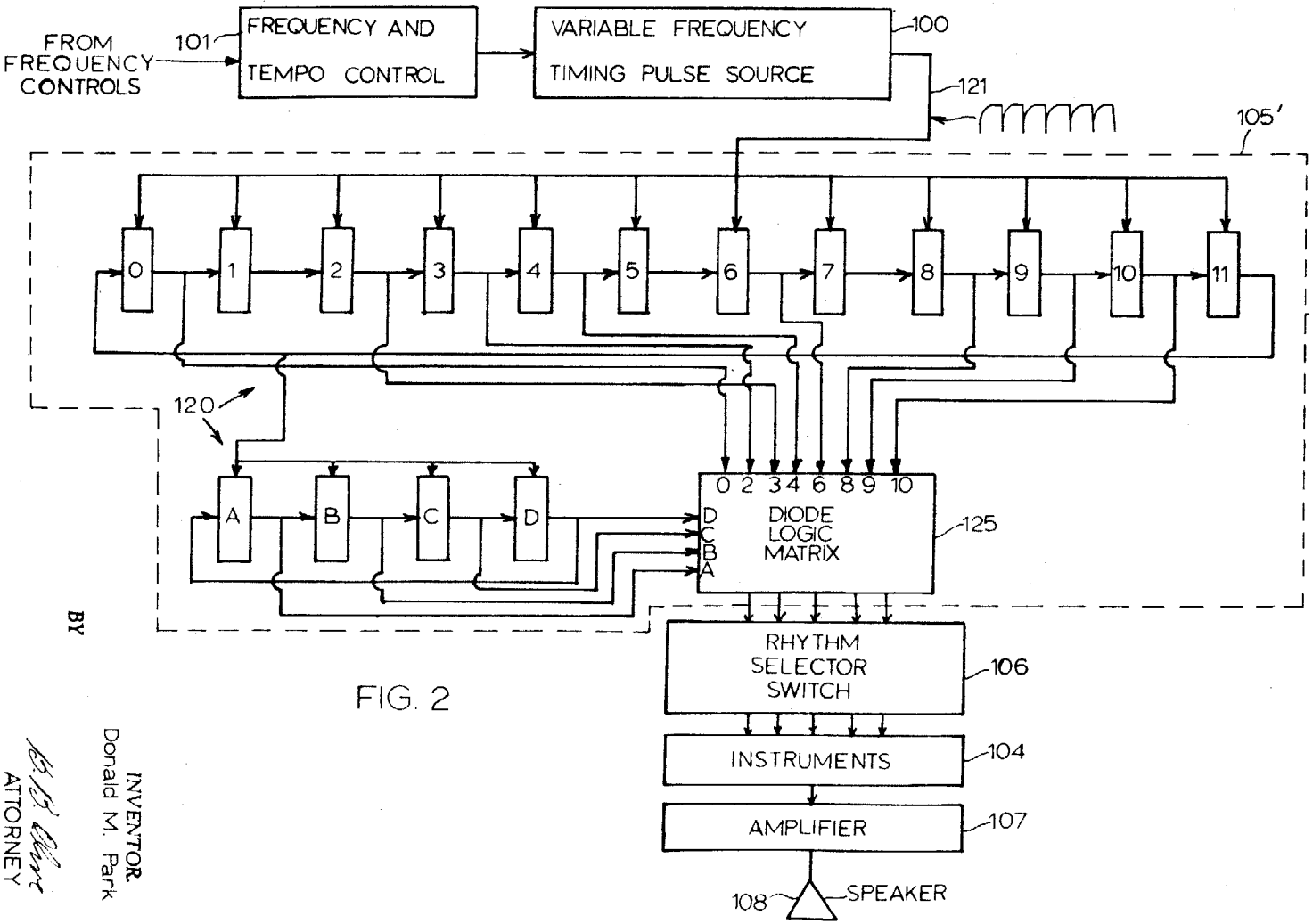
FIGURE 2 is a schematic diagram showing a multistage ring counter and diode logic matrix [cricuit] *circuit* for counting and spatially distributing timing pulses.

Referring next to FIGURE 2, the electronic pulse counting and spatial distributing circuitry 105 of FIGURE 1, is made up in one embodiment of a two ring counter 120 which receives the timing pulse series on line 121. Counter 120 in turn comprises a first counter group of twelve bistable devices 0, 1, 2, 3, 4, 5, 6, 7, 8, 9, 10, 11 and a second counter group of bistable devices A, B, C, D. The bistable devices may be of any type known in the counting art such as a transistor latch, a tunnel diode, a Shockley diode, a Neon tube or another type of bistable transistor device. All of the first group are connected to incoming line 121 and within the first group starting with device zero, each device feeds or "ands" the next successive device until device 11 is reached which feeds back into device zero and also provides a common incoming time counting pulse to all of the devices in the second group. Within the second group, A feeds to B, B to C, C to D and D to A. From the first group of bistable devices the outputs of devices 0, 2, 3, 4, 6, 8, 9 and 10 are fed as indicated in FIGURE 2 to a diode logic matrix 125 and from the second group of bistable devices, the outputs of A, B, C and D are fed to the matrix 125. As indicated in FIGURE 2, the output of matrix 125 is fed to the rhythm selector switch 106.

Figure 3:
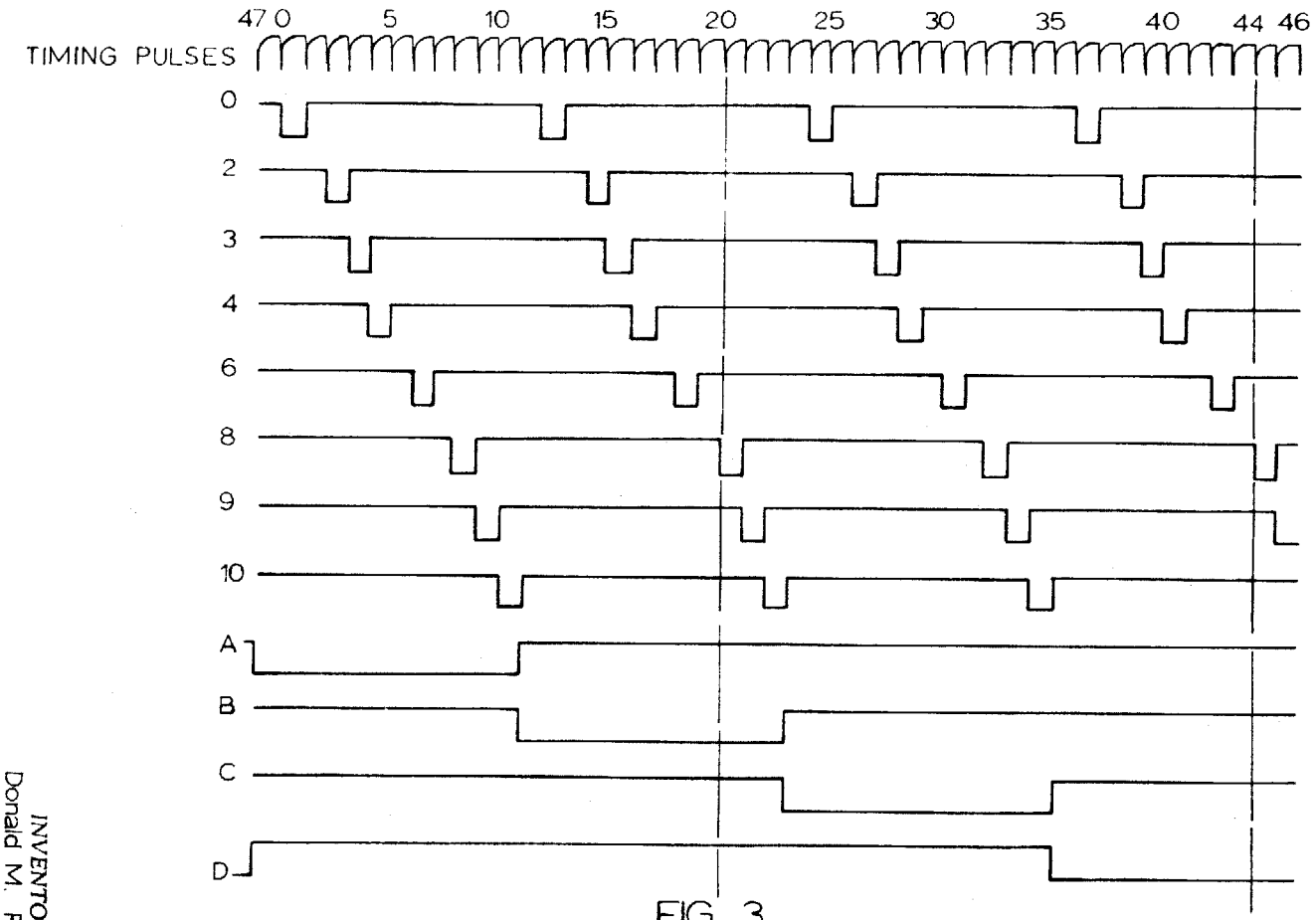
FIGURE 3 is a wave diagram of the timing waves obtained from the counter of FIGURE 2.

In FIGURE 3, there is shown a diagram of representative wave shapes such as might be obtained from the outputs of the bistable devices 0, 2, 3, 4, 6, 8, 9, 10, A, B, C and D with respect to an arbitrary series of 48 input timing pulses coming in on line 121 and labeled 0–47 in FIGURE 3.

Figure 4:
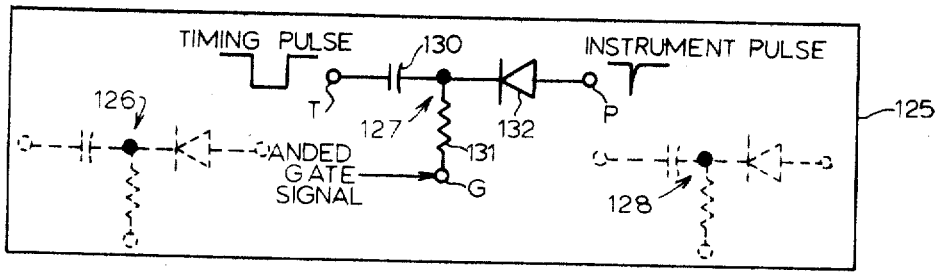
FIGURE 4 schematically illustrates a diode logic circuit employed in the matrix.

Consideration will next be given to the matrix 125 and in this regard it may be noted that the matrix generally consists of an array of diode logic circuits illustrated at 126, 127 and 128 in FIGURE 4. Using circuit 127 as an example, the circuit includes capacitor 130, resistor 131, and diode 132. The individual logic circuits of which there may be great numbers in any particular matrix depending on the rhythm complexity desired have many possible forms of interconnection some of which are explained in later discussion.

Negative potential logic is employed which is defined as meaning that the timing pulse can only get through when the gate is most negative. Assuming that it is desired to select timing pulse 20 in FIGURE 3. That is, we assume that the rhythm selector switch 106 has been positioned so that a particular instrument say a drum is to be pulsed at the time corresponding to timing pulse 20. Looking at FIGURE 3, it can be seen that a time 20, wave 8 goes negative and wave B is negative at this same time. Wave 8 at time 20 since it goes negative at time 20 can thus be used as a time 20 pulse provided it can be gated precisely at time 20. As a function we say time $20=f(8\cdot B)$. By connecting the wave output of bistable device 8 to the input point T of the FIGURE 4 logic circuit and the output of bistable device B to the gate terminal G, a pulse will be derived at terminal P which coincides in time with the timing pulse 20.

Figure 5:
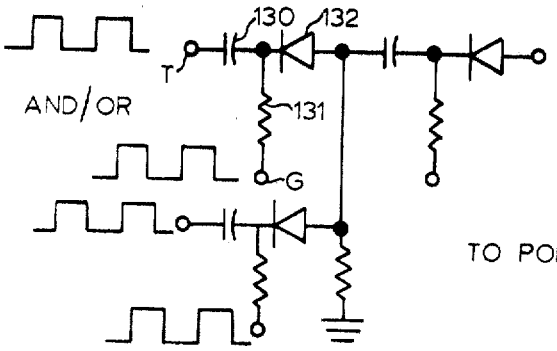
FIGURE 5 schematically illustrates a combining of diode logic circuits.

From the foregoing, it can be seen that the timing pulses ultimately employed are not, when using the counting embodiment of FIGURE 2, the original timing pulses per se but rather are timing pulses that are obtained from the FIGURE 3 array and that coincide within the counting-matrix circuitry with the original timing pulses. In other arrangements of the matrix the original timing pulses could be gated directly. It may also be mentioned that while AND type logic has been discussed, OR type may also be employed as illustrated by FIGURES 5 and 11. Positive potential logic instead of negative potential logic may also be used. Referring for the moment to FIGURE 11, there is illustrated a circuit for combing a plurality of FIGURE 3 gating waves. In FIGURE 11, a fixed positive potential at point 150 applied to load resistor 151 enables an OR action when pulses B or D from FIGURE 3 are applied to the respective diodes 152, 153. In this case, there can be fed to the gate G of FIGURES 4 or 5 the pulse pattern indicated at 154 in FIGURE 11. The object of using the FIGURE 11 OR circuit might for example be to get instrument actuating pulses corresponding to timing pulses 20 and 44 by applying the pulse train 8 from FIGURE 3 to point T of FIGURE 5.

Figure 6:
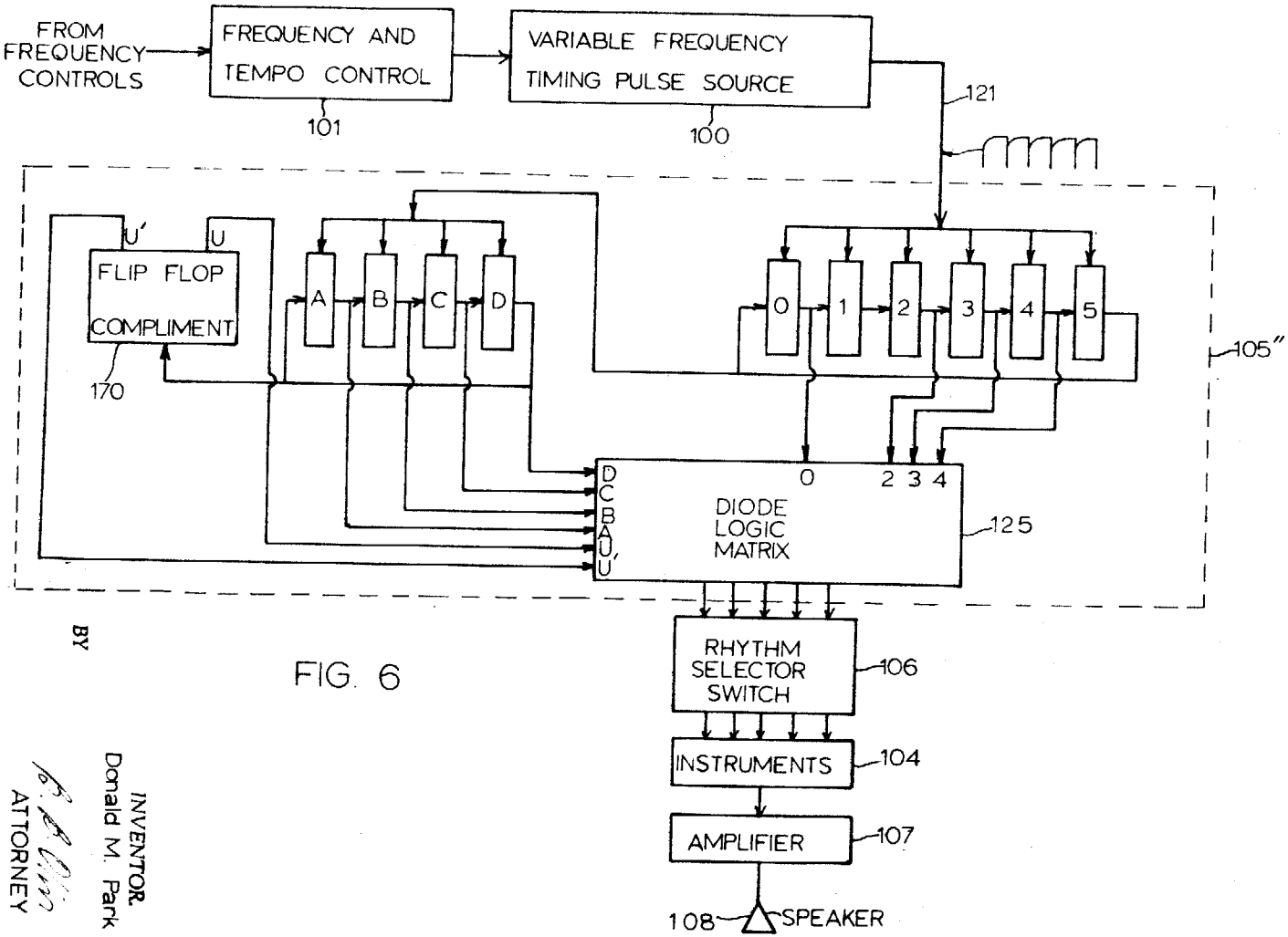
FIGURE 6 schematically illustrates an alternate counting and matrix circuit.

It will be noted that the multi-stage counting arrangement of FIGURE 2 is effectively a scale of 12 counter coupled to a scale of 4 counter. Using the arbitrarily selected sequence of 48 timing pulses per repeatable sequence, it may also be stated that a scale of 8 counter coupled to a scale of 6 counter would be equally effective as well as a scale of 3 coupled to a scale of 16, the object being to get a number of scales which when multiplied together will equal 48. Stated somewhat differently the counting arrangements illustrated provide for a sequential grouping of scale of plural number counters the product of such numbers being equal to the number of timing pulses, such as 48, in a given timing pulse sequence. The principal concept in the present invention is, of course, that of resorting to continuous pulse generation and subsequent utilization of counting and logic theory to place the pulses in time and space where they are needed. One of the advantages of the invention is that the counting-matrix concept leads itself to a variety of arrangements and an almost unlimited choice of pulse selection patterns. FIGURE 6 illustrates, for example, another counter-matrix arrangement substantially different from FIGURE 2 but suitable to the FIGURE 1 generalized diagram with respect to providing the electronic pulse counting and matrix circuitry designated in FIGURE 6 as 105''. In FIGURE 6 certain of the bistable devices of FIGURE 2 namely devices 0, 1, 2, 3, 4, 5, A, B, C and D are used in a different sequential counter grouping and with these devices there is employed a flip-flop 170 which a complement input and outputs U and U'. The operation of the counting arrangement of FIGURE 6 is essentially the same with respect to counting as the counting arrangement of FIGURE 2 except it will be noticed that the grouping provides a scale of 6, a scale of 4 and a scale of 2 ($6\times4\times2=48$). As "frequency dividers" the division is by 6, then 4, then 2. In FIGURE 6 the outputs of the devices 0, 2, 3, 4, A, B, C and D and the outputs U and U' are all fed to the diode logic matrix 125 previously described. The timing wave shapes developed by these various outputs are illustrated in FIGURE 7.

Figure 8:
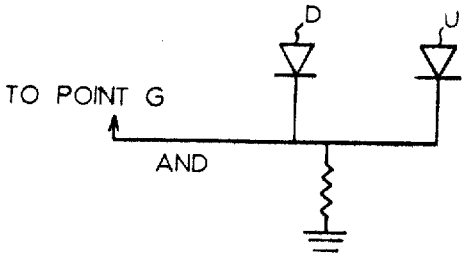
FIGURE 8 schematically illustrates a circuit for combining a plurality of the FIGURE 7 timing waves.
Figure 7:
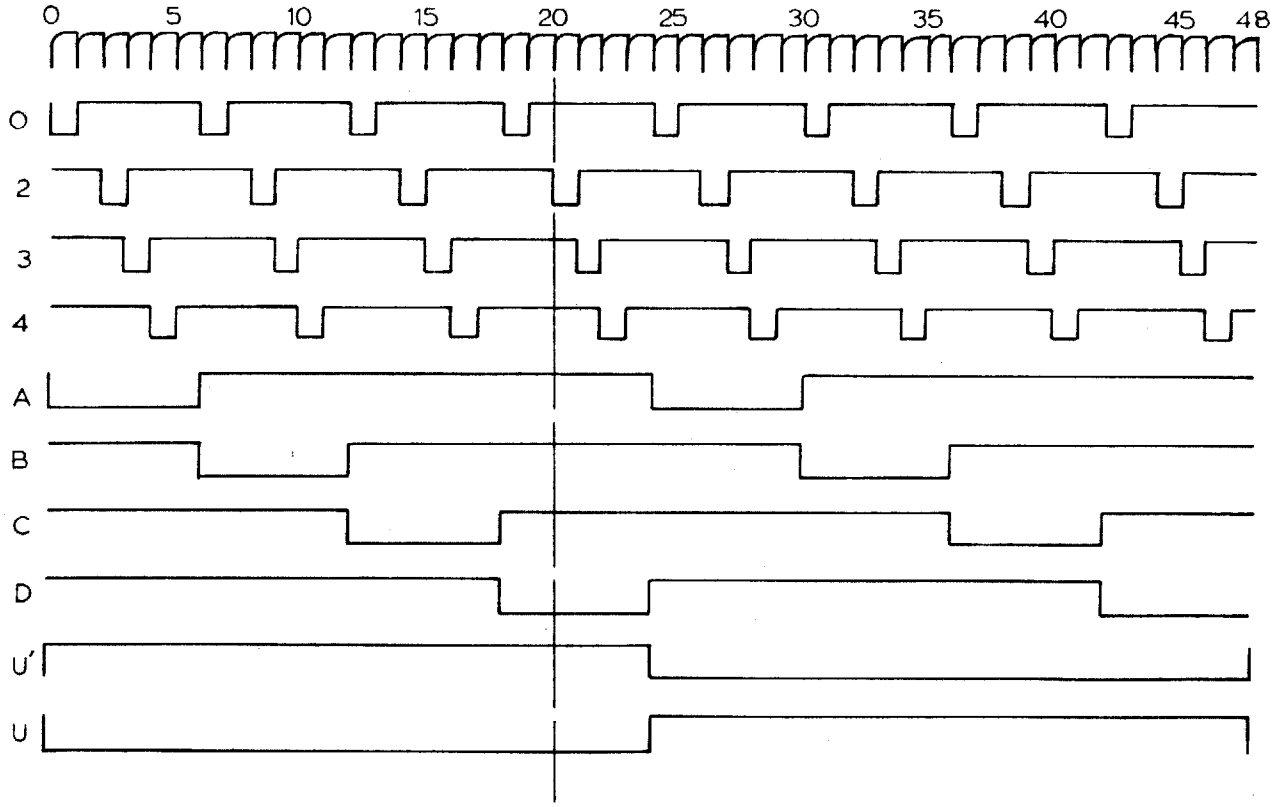
FIGURE 7 is a wave diagram of the timing waves obtained from the counter of FIGURE 6.

Using the logic analysis previously used with respect to FIGURE 3, it can be seen that with respect to FIGURE 7 if we arbitrarily select timing pulse 20, "2" wave from FIGURE 7 goes negative at the time corresponding to timing pulse 20. Therefore "2" can be fed to point T in FIGURE 4. We must now look at FIGURE 7 and find a gate which when formed only allows this pulse (i.e. the "2" pulse at time 20) to go through. That is, we must look for a gate to put point G in an "on" state. Thus, D and U are both negative at the same time. We can write a function $f=DU$ which says that when D and U are both negative, then the gate is "on" at this most negative time. Thus, by forming such an AND gate in simple groups and then making AND and OR groups as for example may be accomplished with FIGURES 5 and 8, it can be seen that relatively complex selections can be obtained. Those skilled in the art will readily appreciate other logic series and parallel combinations which might go to make up the diode logic matrix 125.

Figure 9:
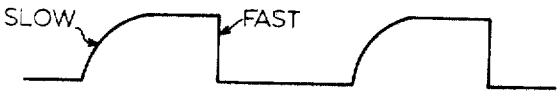
FIGURE 9 illustrates a typical slightly exaggerated wave shape for an NPN type switch.
Figure 10:
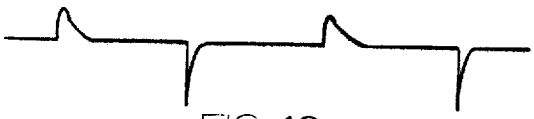
FIGURE 10 illustrates in slightly exaggerated form the FIGURE 9 wave shape after being differentiated.

Of particular interest to the use of negative potential logic is the fact that a fast leading edge of a switched voltage will differentiate into a larger pulse in the output of the diode network than will a slowly switched voltage. The NPN type of switch inherently has the wave shape of FIGURE 9 which differentiates to the wave shape of FIGURE 10. Thus, a relatively large control pulse is obtained as illustrated by FIGURE 10. Therefore, it will readily be seen that if NPN switching is used consistently in the circuit with negative potential logic, the advantage described will be obtained.

The described circuitry is highly flexible in automatically providing a great variety of repetitive rhythms. The designer of the pulse generation, selection, mixing, distribution and tempo regulation circuits has innumerable choices in utilizing the invention once its basic counting and logic matrix theory is fully appreciated.

Having described the invention, what is claimed is:

1. In an electronic music circuit having a plurality of tone generators to be selectively and rhythmically pulsed at given times corresponding to desired beats thereof; a pulse generator operable to produce a continuous sequence of spatially undistributed timing pulses at some predetermined frequency, certain of said timing pulses coinciding in time with certain of said beats; electronic means continuously actuated by said timing pulses *to produce control signals* [and providing at] *a pulse supplying circuit responsive to continuous comparison of said control signals in preselected combinations to provide at each of* a plurality of output terminals a repeatable sequence of tone generator actuating pulses corresponding in time with predetermined ones of said timing pulses and selected ones of said tone generator beats; and means for selectively coupling different ones of said [outputs] *output terminals* to said tone generators whereby [to pulse] particular tone generators and combinations thereof *are pulsed* at particular times according to the desired beats thereof.

2. [In] An electronic music circuit [according to] *as claimed in* claim 1 and including means for adjusting the frequency of said pulse generator.

3. [In] An electronic music circuit [according to] *as claimed in* claim 1 in which said electronic means comprises a counting *circuit* and *said pulse supplying circuit comprises a* diode logic matrix [network].

4. [In] An electronic music circuit as claimed in claim 3 in which said diode logic *matrix* comprises interconnected resistor-capacitor-diode logic elements.

[5. In an electronic music circuit as claimed in claim 3 in which said diode logic depends on NPN transistor switching and negative potential logic.]

6. [In] An electronic music circuit as claimed in claim 1 *and* including means for automatically adjusting the frequency of said pulse generator in accordance with the tempo of a separate operator played [music] *musical* instrument.

7. In an electronic music circuit having a plurality of tone generators to be selectively and rhythmically pulsed at given times corresponding to desired beats thereof; a pulse generator operable to produce a continuous sequence of spatially undistributed timing pulses at some predetermined frequency, certain of said timing pulses coinciding in time with certain of said beats; pulse counting means continuously actuated by said timing pulses and providing at a plurality of output terminals a repeatable sequence of pulses having potentials and potential changes corresponding with predetermined ones of said timing pulses and selected ones of said tone generator beats; a diode logic matrix connected to said output terminals and including gating circuits responsive to the coincidence pattern of said potentials and potential changes at predetermined timing pulse times and being effective to gate to a second set of output terminals a repeatable sequence of tone generator actuating pulses corresponding in time with predetermined ones of said timing pulses and selected ones of said tone generator beats; and means for selectively coupling different ones of said second [outputs] *output terminals* to said tone generators whereby [to pulse] particular tone generators and combinations thereof *are pulsed* at particular times according to the desired beats thereof.

8. In an electronic music circuit having a plurality of tone generators to be selectively and rhythmically pulsed at given times corresponding to desired beats thereof; a pulse generator operable to produce a continuous sequence of spatially undistributed timing pulses at some predetermined frequency, certain of said timing pulses coinciding in time with certain of said beats; pulse counting means continuously actuated by said timing pulses *to produce control signals*; a matrix actuated [by said pulse counting means and providing] *in response to continuous comparison of said control signals in preselected combinations to provide* at each of a plurality of output terminals a repeatable sequence of tone generator actuating pulses corresponding in time with predetermined ones of said timing pulses *and* selected ones of said tone generator beats; and means for selectively coupling different ones of said [outputs] *output terminals* to said tone generators whereby [to pulse] particular tone generators and combinations thereof *are pulsed* at particular times according to the desired beats thereof.

9. In an electronic music circuit having a plurality of tone generators to be selectively and rhythmically pulsed at given times corresponding to desired beats thereof; a pulse generator operable to produce a continuous sequence of spatially undistributed timing pulses at some predetermined frequency, certain of said timing pulses coinciding in time with certain of said beats; multi-stage pulse counting means actuated by said timing pulses and providing at each of a plurality of output terminals a repeatable sequence of *control signals* [pulses] having potentials and potential changes corresponding in time to particular ones of said timing pulses and selected ones of said tone generator beats; a matrix connected to said pulse counting means and including gating means responsive to the [existence] *comparison* of said potentials and potential changes *in preselected combinations* at times corresponding to particular ones of said timing pulses and *said* tone generator beats and providing at each of a second set of output terminals a repeatable sequence of tone generator actuating pulses corresponding in time with predetermined ones of said timing pulses and *said* tone generator beats; and means for selectively coupling different ones of said second output terminals to said tone generators whereby [to pulse] particular tone generators and combinations thereof *are pulsed* at particular times according to the desired beats thereof.

[10. In an electronic music circuit having a plurality of tone generators to be selectively and rhythmically pulsed at gives times corresponding to desired beats thereof; a pulse generator operable to produce a continuous sequence of spatially undistributed timing pulses at some predetermined frequency, certain of said timing pulses coinciding in time with certain of said beats; means for adjusting the frequency of said pulse generator in accordance with the tempo of a separate operator played music instrument; electronic means comprising a multistage ring counting and diode logic network actuated by said timing pulses and providing at a plurality of output terminals a repeatable sequence of tone generator actuating pulses corresponding in time with predetermined ones of said timing pulses and tone generator beats; means for selectively coupling different ones of said outputs to said tone generators whereby to pulse particular tone generators and combinations thereof at particular times according to the desired beats thereof.]

11. In an electronic music circuit having a plurality of tone generators to be selectively and rhythmically pulsed at given times corresponding to desired beats thereof; a pulse generator operable to produce a continuous sequence of spatially undistributed timing pulses at some predetermined frequency, certain of said timing pulses coinciding in time with certain of said beats; multi-sequential stage pulse counting means coupled to said pulse generator and actuated by said timing pulses *to produce control signals*; a diode-resistor-capacitor logic matrix connected to selected stages of said pulse counting means and *responsive to continuous comparison of said control signals in preselected combinations to* [providing] *pro-*

*vide* at each of a plurality of output terminals a repeatable sequence of tone generator actuating pulses corresponding in time with predetermined ones of said timing pulses and *said* tone generator beats; and means for selectively coupling different ones of said [outputs] *output terminals* to said tone generators whereby [to pulse] particular tone generators and combinations thereof *are pulsed* at particular times according to the desired beats thereof.

12. In an electronic music circuit having a plurality of tone generators to be selectively and rhythmically pulsed at given times corresponding to desired beats thereof; a pulse generator operable to produce a continuous sequence of spatially undistributed timing pulses at some predetermined frequency, certain of said timing pulses [coniciding] *coinciding* in time with certain of said beats; sequential counting means coupled to said pulse generator and actuated by said timing pulses and providing at each of a plurality of output terminals a repeatable sequence of [pulses], having potentials and potential changes corresponding in time to particular ones of said timing pulses and *said* tone generator beats; a matrix connected to said pulse counting means and including gating means responsive to the [existence] *comparison* of said potentials and potential changes *in preselected combinations* at times corresponding to particular ones of said timing pulses and *said* tone generator beats and providing at each of a second set of output terminals a repeatable sequence of tone generator actuating pulses corresponding in time with predetermined ones of said timing pulses and *said* tone generator beats; and means for selectively coupling different ones of said second output terminals to said tone generators whereby [to pulse] particular tone generators and combinations thereof *are pulsed* at particular times.

13. [In] An electronic music circuit as claimed in claim 12 in which said sequential counting means comprises a [scale of counter of a first plural number of such as 12] *first counter having a first plural number scale* coupled to said pulse generator and a second [scale of counter of a second plural number such as 4] *counter having a second plural number scale,* the product of the first and second plural numbers being equal to the number of said timing pulses [such as 48,] in a given timing pulse sequence.

14. [In] An electronic music circuit as claimed in claim 12 in which said sequential counting means comprises a succession of coupled scale of plural number counters the product of such numbers being equal to the number of said timing pulses in a given timing pulse sequence.

*15. In an electronic music circuit having a plurality of tone generators to be selectively and rhythmically pulse at given times corresponding to desired beats thereof:*

*a pulse generator operable to produce a continuous sequence of spatially undistributed timing pulses at some predetermined frequency, certain of said timing pulses coinciding in time with certain of said beats;*

*electronic counter means continuously actuated by said timing pulses to produce control signals;*

*a matrix of semiconductor logic gates, with each of said semiconductor logic gates having a preselected combination of said control signals simultaneously applied thereto;*

*an output terminal connected to each of said semiconductor logic gates, each of said gates comparing the control signals in an associated preselected combination of control signals applied thereto to provide at an associated output terminal a repeatable sequence of tone generator actuating pulses corresponding in time with predetermined ones of said timing pulses and selected ones of said tone generator beats; and*

*selector switching means for selectively coupling to individual tone generators a particular output terminal that provides a sequence of actuating pulses to drive the coupled tone generator in the fashion desired for a chosen rhythm.*

*16. An electronic music circuit as claimed in claim 15 wherein said electronic counter means comprises a succession of multi-stage ring counters with each succeeding ring counter being actuated by the last stage of the preceding ring counter to thereby provide a number of different combinations of control signals equal to the cumulative product of the number of stages in said ring counters.*

*17. An electronic music circuit as claimed in claim 15 wherein capacitors are connected to said semiconductor logic gates to differentiate appropriate control signals and provide desired tone generator actuating pulses.*

References Cited

The following references, cited by the Examiner, are of record in the patented file of this patent or the original patent.

UNITED STATES PATENTS

| | | | |
|---|---|---|---|
| 3,140,336 | 7/1964 | Campbell | 84—1.03 |
| 3,247,307 | 4/1966 | Campbell | 84—1.03 |

JOHN S. HEYMAN, *Primary Examiner.*

S. D. MILLER, *Assistant Examiner.*

U.S. Cl. X.R.

84—1.26; 307—218, 223; 328—43

PO-1050
(5/69)

UNITED STATES PATENT OFFICE
CERTIFICATE OF CORRECTION

Patent No. Re. 26,521 Dated February 11, 1969

Inventor(s) Donald M. Park

It is certified that error appears in the above-identified patent and that said Letters Patent are hereby corrected as shown below:

Column 10, line 46 insert --

OTHER REFERENCES

Kamio Kameo, "Electronic Rhythm Instruments and Method of Manufacture", Wireless and Experiments, October 15, 1961, pp. 65-70.

SIGNED AND
SEALED
SEP 30 1969

Fletcher, Jr.
Officer

WILLIAM E. SCHUYLER, JR.
Commissioner of Patents